(12) United States Patent
Chen et al.

(10) Patent No.: US 10,670,791 B2
(45) Date of Patent: Jun. 2, 2020

(54) LIGHT SOURCE MODULE AND SURFACE LIGHT SOURCE ASSEMBLY THEREOF

(71) Applicant: Coretronic Corporation, Hsin-Chu (TW)

(72) Inventors: Hua Chen, Hsin-Chu (TW); Fan-Chun Lin, Hsin-Chu (TW); Chung-Hung Fang, Hsin-Chu (TW); Yen-Hao Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/255,852

(22) Filed: Jan. 24, 2019

(65) Prior Publication Data
US 2019/0227214 A1 Jul. 25, 2019

(30) Foreign Application Priority Data
Jan. 24, 2018 (CN) .......................... 2018 1 0068356

(51) Int. Cl.
*F21V 8/00* (2006.01)
(52) U.S. Cl.
CPC ......... *G02B 6/0021* (2013.01); *G02B 6/0031* (2013.01); *G02B 6/0078* (2013.01)
(58) Field of Classification Search
None
See application file for complete search history.

(56) References Cited

U.S. PATENT DOCUMENTS

| 7,654,687 | B2 * | 2/2010 | Tsai | G02B 5/0247 |
| | | | | 257/98 |
| 8,109,644 | B2 * | 2/2012 | Bierhuizen | G02B 6/0018 |
| | | | | 362/249.02 |
| 10,386,565 | B2 * | 8/2019 | Chen | G02B 6/0043 |
| 2006/0002146 | A1 * | 1/2006 | Baba | G02B 6/0021 |
| | | | | 362/613 |
| 2007/0086179 | A1 | 4/2007 | Chen et al. | |
| 2007/0121340 | A1 * | 5/2007 | Hoshi | G02B 6/0018 |
| | | | | 362/600 |
| 2008/0055931 | A1 * | 3/2008 | Verstraete | G02B 6/0068 |
| | | | | 362/612 |

(Continued)

FOREIGN PATENT DOCUMENTS

| CN | 1721759 A | 1/2006 |
| CN | 101809474 A | 8/2010 |

(Continued)

*Primary Examiner* — Britt D Hanley

(57) ABSTRACT

A surface light source assembly includes at least one light emitting element, a light guide plate and a reflective sheet. Each of the light emitting elements has an annular light emitting side surface. The light guide plate has a bottom surface and a light exit surface opposite to the bottom surface. The bottom surface has at least one accommodating recess to accommodate at least one light emitting element. Each of the accommodating recesses has a light incident surface. The bottom surface further has a flat portion and at least one inclined surface portion. Each of the inclined surface portions is connected between the flat portion and the light incident surface of the corresponding accommodating recess. The reflective sheet is disposed below the flat portion. A light source module having the surface light source assembly is further provided.

11 Claims, 3 Drawing Sheets

(56) References Cited

U.S. PATENT DOCUMENTS

| | | |
|---|---|---|
| 2008/0137335 A1 | 6/2008 | Tsai et al. |
| 2009/0086508 A1* | 4/2009 | Bierhuizen .......... G02B 6/0018 |
| | | 362/617 |
| 2011/0090672 A1* | 4/2011 | Zhu ...................... G02B 6/0018 |
| | | 362/97.1 |
| 2011/0305026 A1* | 12/2011 | Mochizuki ................ F21V 5/04 |
| | | 362/308 |
| 2012/0127754 A1* | 5/2012 | Lin ...................... G02B 6/0068 |
| | | 362/606 |
| 2015/0168775 A1* | 6/2015 | Chang .................... G02B 6/002 |
| | | 362/97.1 |
| 2018/0239076 A1* | 8/2018 | Chen .................... G02B 6/0021 |
| 2018/0314110 A1* | 11/2018 | Chen ................ G02F 1/133602 |
| 2019/0278013 A1* | 9/2019 | Huang ................ G02B 6/0021 |

FOREIGN PATENT DOCUMENTS

| | | |
|---|---|---|
| CN | 102705777 B | 5/2015 |
| CN | 108802887 A | 11/2018 |
| TW | 573143 B | 1/2004 |
| TW | I475295 B | 3/2015 |

\* cited by examiner

LIGHT SOURCE MODULE AND SURFACE LIGHT SOURCE ASSEMBLY THEREOF

CROSS-REFERENCE TO RELATED APPLICATION

This application claims the priority benefit of China application CN201810068356.7, filed on 2018 Jan. 24. The entirety of the above-mentioned patent application is hereby incorporated by reference herein and made a part of this specification.

FIELD OF THE INVENTION

The invention relates to a light source module, and more particularly to a light source module providing a surface light source, and a surface light source assembly thereof.

BACKGROUND OF THE INVENTION

A liquid crystal display panel of a liquid crystal display device does not emit light, so a surface light source needs to be provided by a backlight module. The backlight module includes a direct type backlight module and a side edge backlight module. A current common side edge backlight module is to dispose a light emitting diode (LED) light bar on a side of a light guide plate, and there are a plurality of dots inside the light guide plate. After a light beam provided by the LED light bar enters the light guide plate, the light beam is then emitted from a light exit surface of the light guide plate by the dots. However, since the LED light bar is disposed on the side of the light guide plate, uneven brightness occurs easily, which is not conducive to local dimming.

A current common direct type backlight module is to dispose a plurality of LEDs arranged in a two-dimensional array under a diffusion plate. In order to reduce a quantity of LEDs, a secondary lens is provided corresponding to each LED to increase a light emitting angle of the LED. Compared with the side edge backlight module, the direct type backlight module has better brightness uniformity and is advantageous for local dimming, but with a problem of thicker thickness.

A conventional technology has also developed another hybrid backlight module, which mainly uses a light guide plate to hollow out and place a light emitting diode instead of the secondary lens used in the direct type backlight module to reduce an overall thickness of the hybrid backlight module. However, corners of each light guide plate have apparent dark areas easily, and light leakage is easily formed at edges of each light guide plate. Therefore, the conventional hybrid backlight module has a problem of uneven brightness.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a surface light source assembly to reduce the brightness unevenness of the conventional hybrid backlight module.

The invention provides a light source module to reduce the brightness unevenness of the conventional hybrid backlight module.

Other advantages and objects of the invention may be further illustrated by the technical features broadly embodied and described as follows.

In order to achieve one or a portion of or all of the objects or other objects, a surface light source assembly provided in an embodiment of the invention includes at least one light emitting element, a light guide plate and a reflective sheet. Each of the light emitting elements has an annular light emitting side surface. The light guide plate has a bottom surface and a light exit surface opposite to the bottom surface. The bottom surface has at least one accommodating recess to accommodate at least one light emitting element. Each of the accommodating recesses has a light incident surface, and the light incident surface surrounds the annular light emitting side surface of the light emitting element accommodated in the accommodating recess. The bottom surface further has a flat portion and at least one inclined surface portion. Each of the inclined surface portions is connected between the flat portion and the light incident surface of the corresponding accommodating recess, and each of the inclined surface portions is inclined upward from the light incident surface of the corresponding accommodating recess to be connected to the flat portion. The reflective sheet is disposed below the flat portion and has at least one opening to expose the at least one accommodating recess and the at least one inclined surface portion.

In order to achieve one or a portion of or all of the objects or other objects, a light source module provided in an embodiment of the invention includes a plurality of the above-mentioned surface light source assemblies, wherein the light guide plates of the surface light source assemblies are spliced to each other.

In the surface light source assembly of the embodiment of the invention, the light emitting element disposed in the accommodating recess of the light guide plate has an annular light emitting side surface, and the annular light emitting side surface emits light not only to each side of the light guide plate, but also to each corner of the light guide plate. Therefore, the problem of dark areas in corners of a light guide plate of a conventional hybrid backlight module can be reduced. In addition, in the surface light source assembly of the embodiment of the invention, the reflective sheet is disposed below the flat portion of the bottom surface of the light guide plate, and the inclined surface portion is inclined upward from the light incident surface of the corresponding accommodating recess to be connected to the flat portion. Even when an assembly tolerance between the light guide plate and the reflective sheet is too large and causes a large gap between the light guide plate and the reflective sheet, the light having a large light emitting angle from the light emitting element is not directly incident to the reflective sheet through the gap. Therefore, formation of obvious bright lines can be avoided, and uniformity of exit light can be improved. Since the light source module of the embodiment of the invention uses a plurality of the above-mentioned surface light source assemblies, the problem of uneven brightness of the conventional hybrid backlight module can be reduced.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
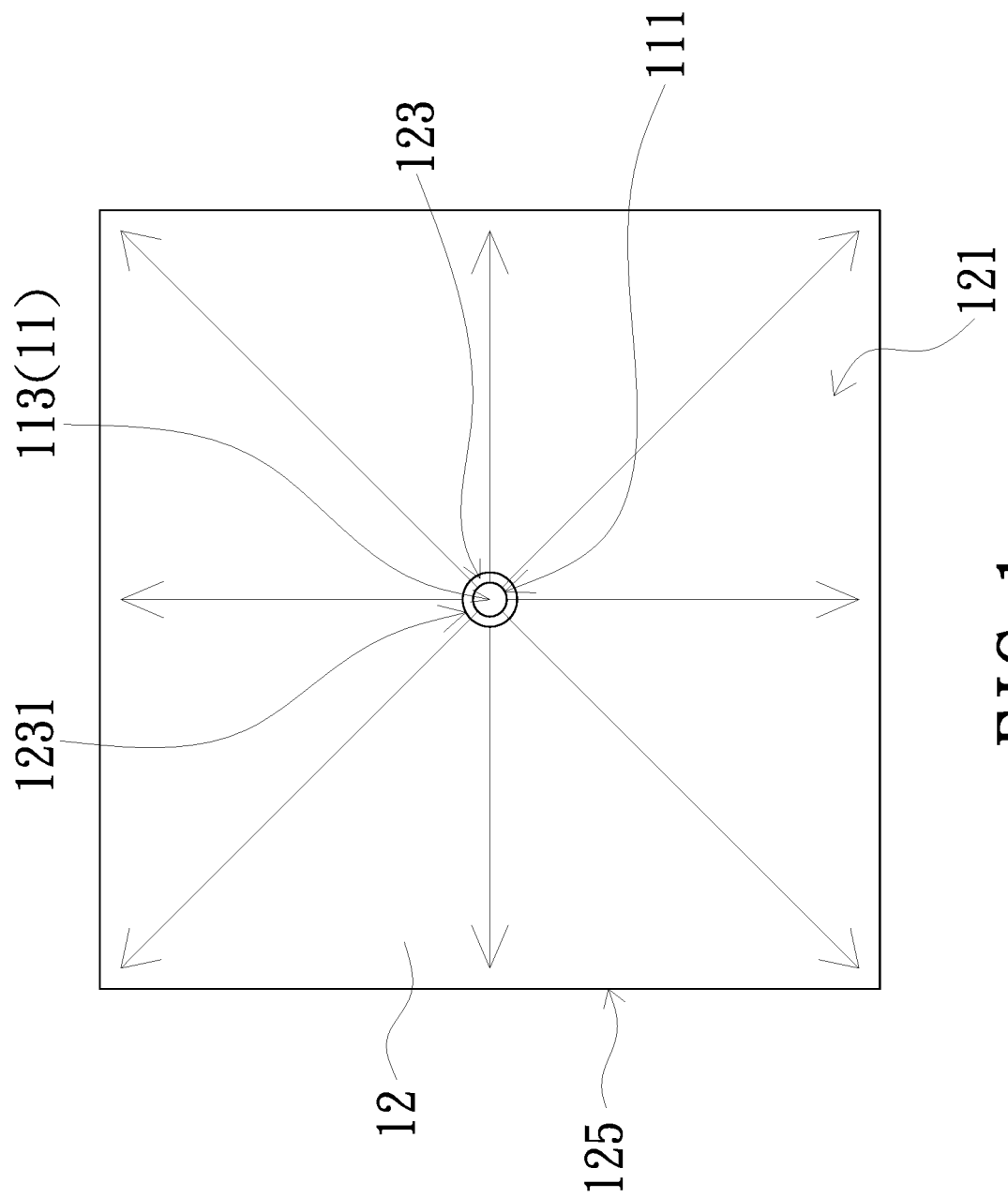
FIG. 1 is a schematic bottom view of a light emitting element and a light guide plate of a surface light source assembly of one embodiment of the invention.
Figure 2:
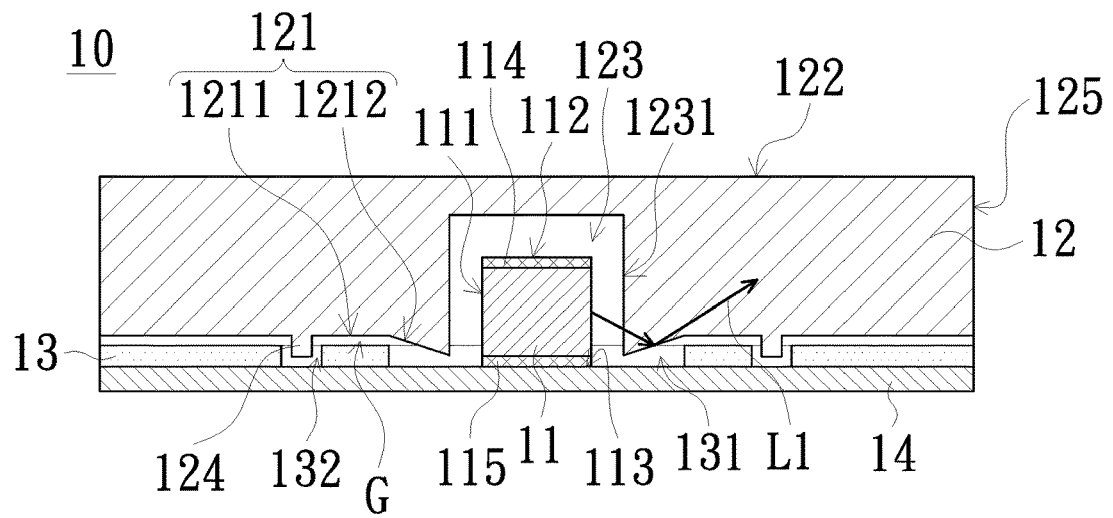
FIG. 2 is a schematic cross-sectional view of a surface light source assembly of one embodiment of the invention.

FIG. 1 is a schematic bottom view of a light emitting element and a light guide plate of a surface light source assembly of one embodiment of the invention. FIG. 2 is a schematic cross-sectional view of a surface light source assembly of one embodiment of the invention. Referring to FIG. 1 and FIG. 2, the surface light source assembly 10 of the embodiment includes at least one light emitting element 11, a light guide plate 12 and a reflective sheet 13. One light emitting element 11 is taken as an example in FIG. 1. In order to facilitate the understanding of the relative arrangement of the light emitting element 11 and the light guide plate 12, the elements such as the reflective sheet 13 are omitted in the schematic bottom view of FIG. 1. Each of the light emitting elements 11 has an annular light emitting side surface 111. The light guide plate 12 has a bottom surface 121 and a light exit surface 122 opposite to the bottom surface 121. The bottom surface 121 has at least one accommodating recess 123 to accommodate at least one light emitting element 11. The quantity of the accommodating recesses 123, for example, corresponds to the quantity of the light emitting elements 11, and FIG. 1 is an example in which one accommodating recess 123 accommodates one light emitting element 11. Each of the accommodating recesses 123 has a light incident surface 1231, and the light incident surface 1231 surrounds the annular light emitting side surface 111 of the light emitting element 11 accommodated in the accommodating recess 123. The bottom surface 121 further has a flat portion 1211 and at least one inclined surface portion 1212. The quantity of the inclined surface portions 1212 corresponds to the quantity of the accommodating recesses 123. Each of the inclined surface portions 1212 is connected between the flat portion 1211 and the light incident surface 1231 of the corresponding accommodating recess 123, and each of the inclined surface portions 1212 is inclined upward from the light incident surface 1231 of the corresponding accommodating recess 123 to be connected to the flat portion 1211. The inclined surface portions 1212 are, for example, inclined surfaces, but may also be curved surfaces. The reflective sheet 13 is disposed below the flat portion 1211 and has at least one opening 131 to expose the at least one accommodating recess 123 and the at least one inclined surface portion 1212. The quantity of the openings 131, for example, corresponds to the quantity of the accommodating recesses 123 and the inclined surface portions 1212, and FIG. 1 is an example in which one opening 131 is used to expose one accommodating recess 123 and one inclined surface portion 1212.

The light guide plate 12 has, for example, four side surfaces 125, and the side surfaces 125 are connected between the bottom surface 121 and the light exit surface 122, but the invention does not limit the quantity of the side surfaces 125 of the light guide plate 12 and the specific shape of the light guide plate 12. For example, the light guide plate 12 of the embodiment is a square structure having four side surfaces 125, and the accommodating recess 123 is a cylindrical accommodating recess.

The light emitting element 11 further includes, for example, a top surface 112 and a lower bottom surface 113 opposite to the top surface 112. The lower bottom surface 113 is adjacent to the bottom surface 121 of the light guide plate 12, and the annular light emitting side surface 111 is connected between the top surface 112 and the lower bottom surface 113, and the top surface 112 does not emit light. The light emitting element 11 is, for example, a light emitting diode, but is not limited thereto. In an embodiment, reflective layers 114, 115 are formed on a top and a bottom of the light emitting element 11, and the light, which would otherwise emerge from the top and the bottom, is reflected by the reflective layers 114, 115 to a side surface of the light emitting element 11 to be emitted, so as to form the light emitting element 11 having the annular light emitting side surface 111. In addition, in an embodiment, the light emitting element having the annular light emitting side surface may also be formed by splicing a plurality of side emitting light sources. Although the embodiment is exemplified by one light emitting element 11, the invention is not limited thereto. For example, the quantity of the light emitting elements 11 is plural, and the quantity of the accommodating recesses 123 is also plural. The light emitting elements 11 are respectively disposed in the accommodating recesses 123. One or more light emitting elements 11 may be disposed in each of the accommodating recesses 123.

The surface light source assembly 10 may further include a substrate 14 to carry the light emitting element 11 and the reflective sheet 13. For example, the substrate 14 may be a printed circuit board to carry and be electrically connected to the light emitting element 11, and the substrate 14 is disposed under the reflective sheet 13.

In order to make a light beam entering the light guide plate 12 emerge from the light exit surface 122, the light guide plate 12 may further include a plurality of dot microstructures (not shown). The dot microstructures may be disposed on the bottom surface 121 or the light exit surface 122 to break the total reflection of the light beam in the light guide plate 12, so that the light beam is emerged from the light exit surface 122. The size and distribution density of the dot microstructures may be adjusted according to design requirements, and are not limited herein.

In the embodiment, the reflective sheet 13 has, for example, a plurality of positioning holes 132, and the flat portion 1211 has, for example, a plurality of positioning pins 124 corresponding to the positioning holes 132, and the positioning pins 124 are inserted into the positioning holes 132. The positioning holes 132 and the positioning pins 124 can fix the light guide plate 12 to the reflective sheet 13. In addition, the positioning holes 132 and the positioning pins 124 may be bonded by an adhesive (not shown). The manner to fix the reflective sheet 13 and the light guide plate 12 is not limited to the above way.

When the adhesive is excessive or the assembly error caused by other factors causes a gap G between the light guide plate 12 and the reflective sheet 13 to become too large, the light beam having a large light emitting angle from the light emitting element may not enter the light guide plate 12 through the light incident surface 1231, but may be transmitted to the reflective sheet 13 through the gap G, and reflected by the reflective sheet 13 to pass through the light guide plate 12, and then forms obvious bright lines on the light exit surface 122. In order to avoid the problem, in the surface light source assembly 10 of the embodiment, the light guide plate 12 has an inclined surface portion 1212 between the light emitting element 11 and the reflective sheet 13 to lengthen the length of the light incident surface 1231 in the longitudinal direction of FIG. 2 to mask the gap G In this way, it is ensured that a light beam L1 having a large light emitting angle enters the light guide plate 12 through the light incident surface 1231. Therefore, formation of obvious bright lines can be avoided, and uniformity of exit light can be improved.

Furthermore, the surface light source assembly 10 may further include a diffusing plate (not shown) or other optical film disposed above the light exit surface 122.

Figure 3:
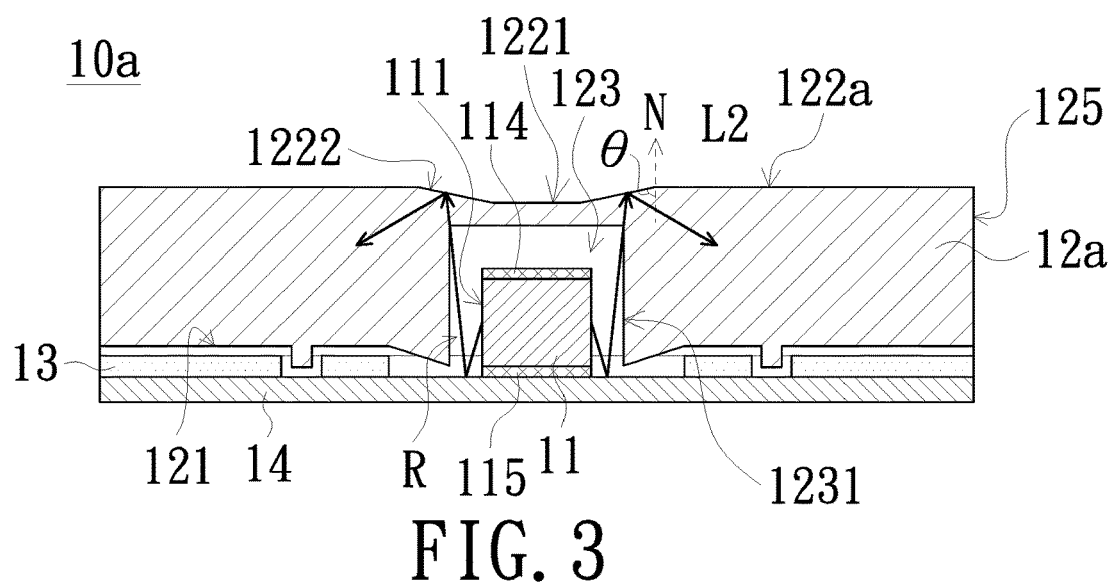
FIG. 3 is a schematic cross-sectional view of a surface light source assembly of another embodiment of the invention.

FIG. 3 is a schematic cross-sectional view of a surface light source assembly of another embodiment of the invention. Referring to FIG. 3, a surface light source assembly 10a of the embodiment is similar to the surface light source assembly 10 of FIG. 2, and the main difference is that the surface light source assembly 10a of the embodiment has at least one concave structure 1221 on a light exit surface 122a of a light guide plate 12a, corresponding to at least one accommodating recess 123. The embodiment is exemplified by one concave structure 1221 corresponding to one accommodating recess 123. An annular gap R is formed between the light incident surface 1231 of the accommodating recess 123 and the annular light emitting side surface 111 of each of the light emitting elements 11, and each of the concave structures 1221 has an inclined reflecting surface 1222 corresponding to the annular gap R.

Considering the assembly tolerance, the volume of the accommodating recess 123 of the light guide plate 12a is designed to be larger than the volume of the light emitting element 11, so that the annular gap R forms between the light emitting element 11 and the light guide plate 12a. Since the substrate 14 covers the annular gap R, part of a light beam L2 having a large light emitting angle emitted from the annular light emitting side surface 111 and transmitted to the bottom surface 121 enters the substrate 14, and is reflected by the substrate 14 and emerges from a portion of the light exit surface 122a corresponding to the accommodating recess 123. Due to the above reasons, obvious bright lines are formed on the portion of the light exit surface 122a corresponding to the accommodating recess 123, resulting in unevenness of exit light.

Therefore, the light exit surface 122a of the embodiment has the concave structure 1221, and the light beam L2 can be reflected back to the light guide plate 12 through the inclined reflecting surface 1222 of the concave structure 1221 to reduce the problem of unevenness of exit light. The angle θ between the inclined reflecting surface 1222 and the normal direction N of the light exit surface 122a is, for example, 30° to 60°, but is not limited thereto.

Figure 4:
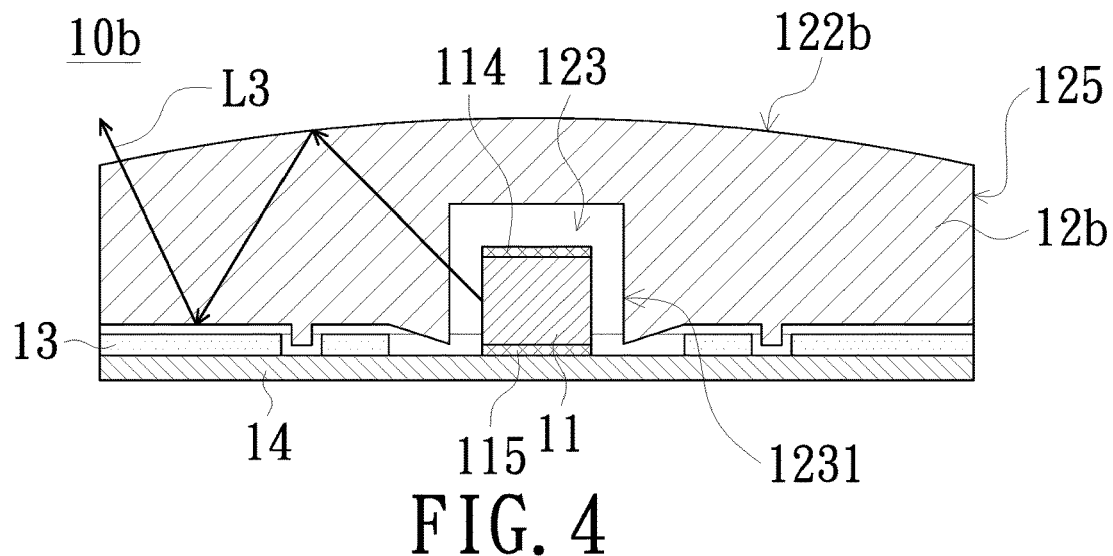
FIG. 4 is a schematic cross-sectional view of a surface light source assembly of another embodiment of the invention.

FIG. 4 is a schematic cross-sectional view of a surface light source assembly of another embodiment of the invention. Referring to FIG. 4, a surface light source assembly 10b of the embodiment is similar to the surface light source assembly 10 of FIG. 2, and the main difference is that a light exit surface 122b of a light guide plate 12b of the surface light source assembly 10b of the embodiment is a convex surface. A height of the light exit surface 122b is, for example, gradually lowered from a center toward the side surface 125, and the convex surface may be, for example, a curved surface or an inclined surface or a plurality of inclined surfaces inclined from the center toward the side surface 125.

When the light exit surface 122b of the light guide plate 12b is a convex surface, an incident angle of a light beam in the light guide plate 12b on the light exit surface 122b can be changed, so that a light beam L3, which is totally reflected to the side surface 125 of the light guide plate 12b and leaks light from the side surface 125 when the light exit surface 122b is a flat surface, is reflected to the bottom surface 121 of the light guide plate 12, and is reflected by the bottom surface 121 and then emerges from the light exit surface 122b to reduce a light leakage at edges of the light guide plate 12b. Thus, the surface light source assembly 10b of the embodiment can improve the uniformity of exit light.

Figure 5:
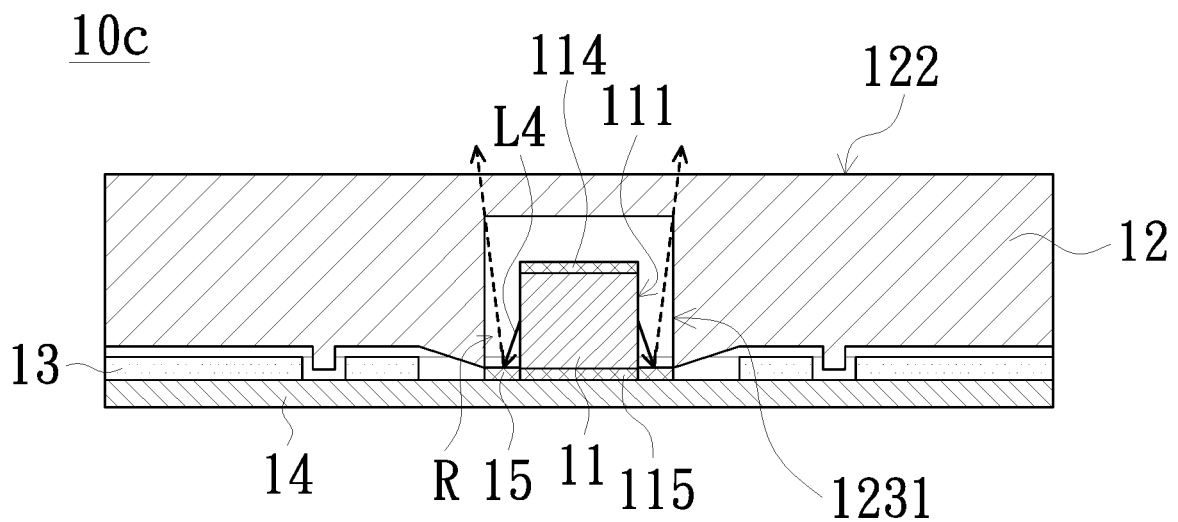
FIG. 5 is a schematic cross-sectional view of a surface light source assembly of another embodiment of the invention.

FIG. 5 is a schematic cross-sectional view of a surface light source assembly of another embodiment of the invention. Referring to FIG. 5, a surface light source assembly 10c of the embodiment is similar to the surface light source assembly 10 of FIG. 2, and the main difference is that the surface light source assembly 10c of the embodiment further includes a light absorbing layer 15. Specifically, the light absorbing layer 15 of the embodiment is adjacent to the bottom surface 121 of the light guide plate 12, and is disposed corresponding to the annular gap R. The light absorbing layer 15 of the embodiment is, for example, a light absorbing layer that is disposed in an annular shape corresponding to the annular gap R. However, in other embodiments, the light absorbing layer 15 disposed in the annular gap R may be disposed to surround one side, two sides or more sides of the light emitting element 11 according to design requirements. Further, the light emitting element 11 is disposed on the substrate 14 and accommodated in the accommodating recess 123, and the light absorbing layer 15 is disposed on the substrate 14. The light absorbing layer 15 is, for example, a paint, a tape or a plating layer, etc., which has a low reflectance (high absorbance), but is not limited thereto. For example, the light absorbing layer 15 may be a black tape and attached to the substrate 14 corresponding to the annular gap R. In one embodiment, the substrate 14 is, for example, a printed circuit board, and the light absorbing layer 15 is a printed pattern layer of the substrate 14. That is, the light absorbing layer 15 can be printed together when the substrate 14 is fabricated, so that the step of additionally providing the light absorbing layer 15 can be omitted.

By providing the light absorbing layer 15 in the annular gap R, part of a light beam L4 having a large light emitting angle emitted from the light emitting element 11 and transmitted to the bottom surface 121 can be absorbed. Therefore, the problem of bright lines of the portion of the light exit surface 122 of the light guide plate 12 corresponding to the annular gap R is reduced.

Figure 6:
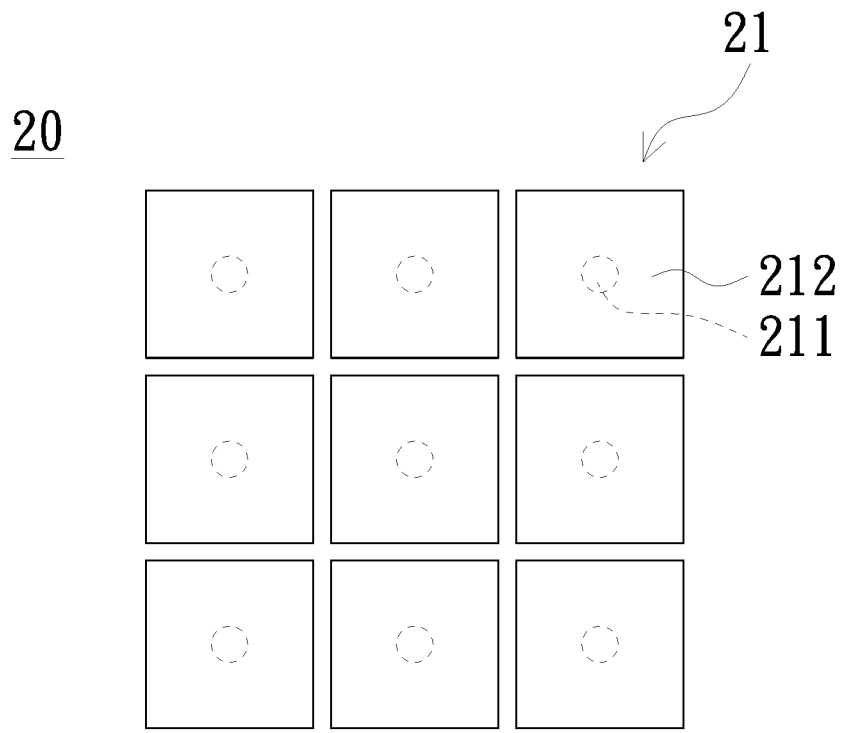
FIG. 6 is a schematic top view of a light source module of one embodiment of the invention.

FIG. 6 is a schematic top view of a light source module of one embodiment of the invention. Referring to FIG. 6, a light source module 20 of the embodiment includes a plurality of surface light source assemblies 21. Each of the surface light source assemblies 21 includes a light emitting element 211 and a light guide plate 212, and the light guide plates 212 of the surface light source assemblies 21 are spliced into a large sized light guide structure. The surface light source assembly 21 may be the surface light source assembly of any of the above embodiments, such as the surface light source assemblies 10, 10a, 10b, 10c. Since the light source module 20 uses the surface light source assemblies 10, 10a, 10b, and 10c of any of the above embodiments, it is possible to provide a surface light source having better brightness uniformity.

In summary, in the surface light source assembly of the embodiment of the invention, the light emitting element disposed in the accommodating recess of the light guide plate has an annular light emitting side surface, and the annular light emitting side surface emits light not only to each side of the light guide plate, but also to each corner of the light guide plate. Therefore, the problem of dark areas in corners of a light guide plate of a conventional hybrid backlight module can be reduced. In addition, in the surface light source assembly of the embodiment of the invention, the reflective sheet is disposed below the flat portion of the bottom surface of the light guide plate, and the inclined surface portion is inclined upward from the light incident surface of the corresponding accommodating recess to be connected to the flat portion. Even when an assembly tolerance between the light guide plate and the reflective sheet is too large and causes a large gap between the light guide plate and the reflective sheet, the light beam having a large light emitting angle from the light emitting element is not directly incident to the reflective sheet through the gap. Therefore, formation of obvious bright lines can be avoided, and uniformity of exit light can be improved. Since the light source module of the embodiment of the invention uses a plurality of the above-mentioned surface light source assemblies, the problem of uneven brightness of the conventional hybrid backlight module can be reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A surface light source assembly, comprising:
at least one light emitting element, wherein each of the at least one light emitting element has an annular light emitting side surface;
a light guide plate, having a bottom surface and a light exit surface opposite to the bottom surface, wherein the bottom surface has at least one accommodating recess to accommodate the at least one light emitting element, each of the accommodating recesses has a light incident surface, the light incident surface surrounds the annular light emitting side surface of the light emitting element accommodated in the accommodating recess, the bottom surface further has a flat portion and at least one inclined surface portion, each of the inclined surface portions is connected between the flat portion and the light incident surface of the corresponding accommodating recess, and each of the inclined surface portions is inclined toward the light exit surface from the light incident surface of the corresponding accommodating recess to be connected to the flat portion; and a reflective sheet, disposed below the flat portion and having at least one opening to expose the at least one accommodating recess and the at least one inclined surface portion.

2. The surface light source assembly according to claim 1, wherein the light exit surface has at least one concave structure corresponding to the at least one accommodating recess.

3. The surface light source assembly according to claim 2, wherein an annular gap is formed between the light incident surface and the annular light emitting side surface, and each of the concave structures has an inclined reflecting surface corresponding to the annular gap.

4. The surface light source assembly according to claim 1, wherein the light exit surface of the light guide plate is a convex surface.

5. The surface light source assembly according to claim 1, wherein an annular gap is formed between the light incident surface and the annular light emitting side surface, the surface light source assembly further comprises a light absorbing layer, and the light absorbing layer is adjacent to the bottom surface of the light guide plate and is disposed corresponding to the annular gap.

6. The surface light source assembly according to claim 5, further comprising a substrate, wherein the at least one light emitting element is disposed on the substrate and accommodated in the at least one accommodating recess, and the reflective sheet and the light absorbing layer are disposed on the substrate.

7. The surface light source assembly according to claim 6, wherein the substrate is a printed circuit board, and the light absorbing layer is a printed pattern layer of the substrate.

8. The surface light source assembly according to claim 1, wherein the reflective sheet has a plurality of positioning holes, the flat portion has a plurality of positioning pins corresponding to the positioning holes, and the positioning pins are inserted into the positioning holes.

9. The surface light source assembly according to claim 1, wherein the quantity of the at least one light emitting element is plural, the quantity of the at least one accommodating recess is plural, and the light emitting elements are respectively disposed in the accommodating recesses.

10. The surface light source assembly according to claim 1, wherein each of the light emitting elements comprises a top surface and a lower bottom surface opposite to the top surface, the lower bottom surface is adjacent to the bottom surface of the light guide plate, the annular light emitting side surface is connected between the top surface and the lower bottom surface, and the top surface does not emit light.

11. A light source module, comprising:

a plurality of surface light source assemblies according to claim 1, wherein the light guide plates of the plurality of surface light source assemblies are positioned adjacent to one another to form a light guide structure.

* * * * *